Figure 1:
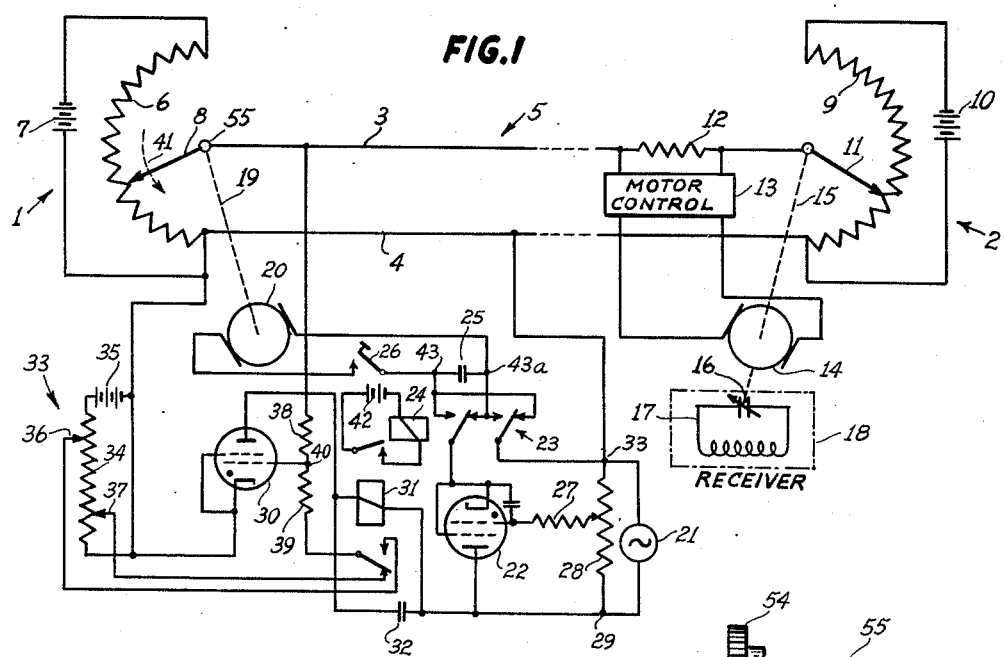

May 22, 1951   M. N. YARDENY ET AL   2,554,080
SCANNING SYSTEM
Filed April 23, 1948

INVENTORS
MICHEL N. YARDENY
BY ADOLPH RAZDOWITZ
Karl F. Ross
AGENT

Patented May 22, 1951

2,554,080

UNITED STATES PATENT OFFICE 2,554,080

SCANNING SYSTEM

Michel N. Yardeny and Adolph Razdowitz, New York, N. Y.; said Razdowitz assignor to said Yardeny, now by judicial change of name Michel N. Yardney Application April 23, 1948, Serial No. 22,864

8 Claims. (Cl. 318—282)

The present invention relates to scanning systems and, more particularly, to systems adapted for the periodic automatic displacement of a control device, such as a potentiometer, alternately in one direction and another.

In the co-pending U. S. patent application of Michel N. Yardeny and Robert Bernas, Ser. No. 5,276, filed January 30, 1948, now abandoned, we have disclosed a system for the remote actuation of one or more loads, e. g. the various controls of a receiver, by means of position-determining D.-C. voltages communicated over a two-wire transmission line. As stated in the aforesaid application, the transmission line is connected at each end to a potentiometer applying voltages to said line which normally are in balance; when the potentiometer at one end is reset, a motor at the other end will respond to the resulting unbalance and will act to reset the second potentiometer as well as the associated load or control until the two voltages are again equal.

It will be obvious that in a system of the type described it is not practical to employ conventional scanning means comprising, for example, a tuning condenser mounted on a shaft continuously rotating in one direction. Such an arrangement would either require the provision of two circular potentiometers which in turn would result in the existence of a discontinuity of potential at one point of the scanning sweep, or it would be necessary to translate the rotary movement into a linear one which would involve mechanical problems as well as result in a nonlinear sweep.

It is, therefore, an object of the present invention to provide means for producing an automatic scanning sweep in a remote control system of the character described.

It is another object of the invention to provide means for periodically reversing the sense of rotation of a scanning motor whereby continuously and substantially linearly varying control voltages may be applied to a transmission channel.

It is a further object of the invention to provide electronic means for adjustably fixing the limits of a reciprocatory scanning sweep.

It is still another object to provide means for producing voltages varying continuously between presettable limits, the limiting voltages themselves serving to actuate switch-over means whereby the direction of the voltage sweep will be reversed.

According to one of its features, the invention provides a source of variable voltage, first and second fixed voltage sources determining the limits of a voltage sweep to be produced by said variable voltage source, a motor actuating the first-mentioned source in one of two possible senses to vary the voltage output thereof, and electronic switch-over means responsive to a predetermined combination of said voltage output and a respective one of said fixed voltages for reversing the sense of actuation of said first-mentioned source by said motor.

According to another of its features, the invention provides alternatively operable manual and automatic means for varying the output of a source of variable voltage, and means effective during operation of said automatic means for periodically reversing the latter whereby the output of said source will vary between predetermined limits.

Figure 2:
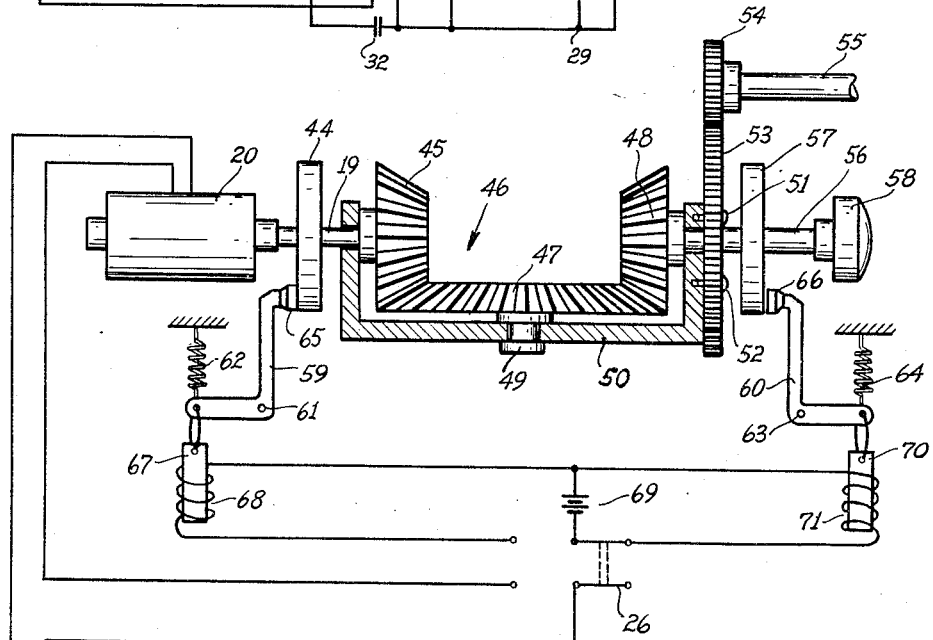

The above and other features and objects of the invention will become apparent from the following description of a preferred embodiment, reference being had to the accompanying drawing in which:

Fig. 1 is a circuit diagram of a scanning system according to the invention; and Fig. 2 is a schematical illustration of the mechanism for alternately blocking the manual and the automatic input to the system of Fig. 1.

Referring to Fig. 1, there are shown a pair of potentiometers 1, 2 provided, respectively, at a local and at a remote station interconnected by the conductors 3, 4 of a transmission line 5. The potentiometer 1 at the local station comprises a resistor 6, a battery 7 and a wiper 8; similarly, the potentiometer 2 at the remote station comprises a resistor 9, a battery 10 and a wiper 11. It will be seen that conductor 3 is connected to the wipers 8 and 11 while conductor 4 interconnects the positive terminals of resistors 6 and 9. Although our aforesaid co-pending application discloses means for selectively connecting one of several potentiometers to each end of a transmission line, it may be assumed for the purposes of the present invention that the potentiometers 6 and 9 are permanently connected to the line 5 in the manner indicated.

At the remote station an impedance 12 is connected in series with conductor 3. A motor control 13, of any suitable design, is connected across the terminals of impedance 12 and controls a motor 14 in such a manner that any voltage drop existing across this impedance will actuate the motor in one sense or the other, depending upon the polarity of the voltage drop. Motor 14 has its shaft 15 coupled to the wiper 11 of potentiometer 2 in such a way that actuation of the motor in the aforedescribed manner will tend to balance the voltage applied to the line by potentiometer 1 whereby the voltage drop across impedance 12 will be reduced to zero, stopping the motor. Hence it will be seen that any displacement of wiper 8, effected by any means whatsoever, will instantaneously actuate the motor 14 so as to displace the wiper 11 in similar manner, whereby virtual synchronization of the movements of both wipers will be obtained. While the potentiometer 2 will necessarily lag slightly behind potentiometer 1, thereby introducing a certain phase difference, the existence of such difference will be unimportant in many instances and its magnitude may be reduced by increasing the sensitivity of motor control 13.

The shaft 15 of motor 14 is further coupled to the adjustable condenser 16 of a tuned circuit 17 which forms part of a receiver 18 located at the remote station.

At the local or control station, the wiper 8 of potentiometer 1 is operatively coupled to the shaft 19 of a motor 20. The energizing circuit for this motor includes an alternating-current generator 21, a thyratron 22 functioning as a rectifier and speed regulator, a reversing switch 23 comprising the armatures of a relay 24, a shunting condenser 25 and a starting switch 26. The thyratron 22 is of the two-grid type and comprises a suppressor grid connected to the cathode and a control grid connected by way of the usual current-limiting resistor 27 to the movable tap of a potentiometer 28 which is bridged across the generator 21. It will be understood that any adjustment of potentiometer 28 will change the instant at which tube 22 becomes conductive during positive half-cycles, thereby varying the magnitude of the average energizing current admitted to the motor 20 and altering the speed of the motor.

The generator 21 also has one terminal 29 connected to the plate of a thyratron 30 by way of the winding of a relay 31 which is shunted by a condenser 32, and has its other terminal 33 connected to the cathode of thyratron 30 by way of conductor 4. A potentiometer 33, comprising a resistor 34, a battery 35 and sliders 36, 37, is connected with its negative terminal to the positive terminal of potentiometer 1 and also to the cathode of thyratron 30. The more positive slider 36 is connected to a front contact and the more negative slider 37 to a back contact of the lower armature of relay 31. Thyratron 30 has a cathode-biased suppressor grid and a control grid which is connected to the junction point of two resistors 38, 39 constituting a voltage divider, resistor 38 being connected between wiper 8 and junction point 40 and resistor 39 being connected between point 40 and the lower armature of relay 31. Preferably, the two resistors 38, 39 are of equal magnitude and the thyratron 30 is designed so that, when the bias on its control grid is zero, sufficient current will flow through it during positive alternations of the generator 21 that relay 31 becomes energized and remains operated through the smoothing action of condenser 32.

As will be clear from the subsequent description, slider 36 determines the upper and slider 37 the lower limit of the negative voltage sweep applied to the line 5 by the potentiometer 1. Motor 20 is adjusted so that, in the position of the reversing switch illustrated (corresponding to de-energized condition of relay 24), the wiper 8 travels downward, i. e. toward the positive terminal of potentiometer 1, as indicated by the arrow 41.

The operation of the system illustrated in Fig. 1 is as follows:

In the position shown, the potential of point 40 represents substantially the arithmetical mean of the preset potential of slider 37 and the instantaneous potential of wiper 8, relative to the conductor 4. The first of these potentials is considerably negative while the second is but slightly positive, the control grid of thyratron 30 being therefore held at a potential which is negative relative to its cathode. When the switch 26 is closed, motor 20 begins to rotate and, as stated above, displaces the wiper 8 toward the positive end of the potentiometer 1, thereby gradually increasing the potential of the control grid of tube 30. Finally, when the wiper 8 reaches a point whose potential is equal in magnitude but opposite in polarity to that of slider 37, the bias of tube 30 becomes zero, the tube fires and relay 31 is energized.

When the relay 31 attracts its lower and upper armatures, the latter closes an energizing circuit for relay 24, by way of battery 42; relay 24 thereupon actuates the switch 23, reversing the sense of rotation of motor 20. At the same time the lower armature of relay 31 connects slider 36 to resistor 39, driving the grid of tube 30 highly positive since the potential of point 40 now becomes the arithmetical mean of the potential of wiper 8 and that of slider 36. Accordingly, tube 30 continues to fire, relays 31 and 24 remain energized and the sense of rotation of motor 20 is not changed until the wiper 8 reaches a point whose potential is equal in magnitude but opposite in polarity to that of slider 36. At this point tube 30 de-ionizes, relays 31 and 24 release and the sense of rotation of motor 20 is again reversed, wiper 8 rotating counter-clockwise toward its lower limit as previously described. Because the speed of motor 20 after each reversal will be constant, a substantially linear voltage sweep will be obtained.

Referring now to Fig. 2, there is shown a mechanical arrangement permitting the automatic scanning system of Fig. 1 to be used alternatively with a manual scanning system. Starting switch 26 is shown here as a double-pole, double-throw switch which in the position illustrated opens the energizing circuit for motor 20 leading from terminals 43 and 43a, these terminals corresponding to the junction points indicated by the same numerals in Fig. 1. The shaft 19 of motor 20 carries a disc or brake drum 44 and has also mounted thereon a planet gear 45 of a differential gearing 46, the latter further comprising the sun gear 47 and the second planet gear 48. Sun gear 47 is pivoted at 49 to a frame 50 having fastened thereto, as by screws 51, 52, a gear 53 which meshes with a pinion 54. Pinion 54 is fixed to a shaft 55 which carries the wiper 8 (not shown in Fig. 2).

The planet gear 48 is mounted on a shaft 56 carrying a disc or brake drum 57 as well as the knob 58 which represents the manual input to potentiometer 1. Each of the discs 44, 57 cooperates with a bell crank lever 59, 60, respectively, lever 59 being pivoted at 61 and biased by a spring 62 and lever 60 being pivoted at 63 and biased by a spring 64. Springs 62, 64 tend to press brake shoes 65, 66 provided on levers 59 and 60, respectively, against the faces of discs 44 and 57.

Secured to the horizontal arm of bell crank lever 59 is the armature 67 of a solenoid 68 adapted to be energized from a source of power 69 when the switch 26 is thrown so as to close the energizing circuit of motor 20. Similarly, the horizontal arm of bell crank lever 60 is secured to the armature 70 of a solenoid 71 adapted to be energized from the same source 69 when the switch 26 is in the position shown in the drawing. In the latter postion, the pull of armature 70 counteracts the force of spring 64 sufficiently to disengage shoe 66 from disc 57, thereby freeing the knob 58 for manual rotation; since the movement of gear 45 is blocked simultaneously by the shoe 65 acting upon the disc 44, any rotation of knob 58 will be transmitted to frame 50, gear 53, and pinion 54 and, ultimately, to the wiper 3 of potentiometer 1. When, however, the position of switch 26 is reversed, disc 57 will be engaged by brake shoe 66, thereby blocking the manual input, while solenoid 68 will attract its armature 67 sufficiently to overcome the force of spring 62 and unblock the shaft 19 whereby the rotation of the newly energized motor 20 will be transmitted to shaft 55 and, thence, to the wiper 8.

Although the invention has been described with reference to a specific, now preferred embodiment thereof, it is to be distinctly understood that the arrangement disclosed is capable of numerous modifications and adaptations without departing from the spirit and scope of the invention; for example, the arrangement for blocking and unblocking the alternative inputs to potentiometer 1, as shown in Fig. 2, may be replaced by any equivalent electrical or mechanical arrangement, such as cam-operated brakes or locking devices.

It will furthermore be appreciated by those skilled in the art that one or both of the inputs to the differential gearing 46 may be of the self-locking type in which either or both of the gears 45, 48 are actuated, for example, over respective worm drives instead of being connected directly to shafts 19 and 56; in such an event either or both of the immobilizing arrangements 59, 62, 68 and 60, 64, 71 will become unnecessary.

We claim:

1. A scanning system comprising a potentiometer having a movable arm, an electronic discharge device having a cathode, an anode and a control grid, said cathode being connected to a terminal of said potentiometer, a load circuit for said device, a source of space current in said load circuit, a relay connected in said load circuit in series with said source, said relay having an armature, a first resistor connected between said armature and said control grid, a second resistor connected between said control grid and said movable arm, a motor coupled to said arm, an energizing circuit for said motor, switch-over means in said energizing circuit for reversing said motor, said switch-over means being controlled by said device in such manner as to render the potential of said arm progressively more positive when said device is non-conductive, a source of relatively negative potential connectable by said armature to said first resistor when the relay is unoperated, whereby a bias voltage will be applied to said grid which will be insufficient to render said device conductive until said arm acquires a predetermined relatively positive potential, and a source of relatively positive potential connectable by said armature to said first resistor when the relay is operated, whereby a bias voltage will be applied to said grid which will be sufficient to cause said device to conduct and maintain said relay operated until said arm acquires a predetermined relatively negative potential.

2. A system according to claim 1 wherein said switch-over means comprises a second relay arranged to be energized when the first-mentioned relay is operated.

3. A system according to claim 1 wherein said electronic discharge device comprises a gas-filled tube and said source of space current is a generator of alternating current, further comprising a condenser shunted across said relay to maintain the same operated during negative alternations of said generator.

4. A system according to claim 1 wherein said energizing circuit comprises a generator of alternating current, a gas-filled tube in series with said generator, and biasing means for said tube whereby the extent of energization of said motor and the speed thereof may be controlled.

5. A system according to claim 4 wherein said biasing means comprises a control potentiometer bridged across said generator, said gas-filled tube having a control grid connected to the variable tap of said control potentiometer whereby the duration of the period of conductivity of said tube during positive alternations of said generator may be varied.

6. In combination, a potentiometer having a movable arm; a shaft carrying said arm; a differential gearing having a frame, a sun gear pivoted on said frame and first and second planet gears meshing with said sun gear; a mechanical coupling between said frame and said shaft; a motor; a first input shaft connecting said motor with said first planet gear; a manually operable knob; a second input shaft connecting said knob with said second planet gear; first blocking means adapted to immobilize said first shaft; second blocking means adapted to immobilize said second shaft; power means alternatively connectable to actuate said first or said second blocking means; an energizing circuit for said motor; and switch means operable simultaneously to close said energizing circuit and to connect said power means for actuation of said second blocking means whereby said movable arm will be responsive to said motor only.

7. A scanning system comprising a source of variable voltage having a movable element, an electronic discharge device having an input connected across the output of said source, reversible driving means adapted to displace said element in either of two directions for varying the output voltage of said source in one sense or another, respectively, said driving means being responsive to the conductive and the non-conductive condition of said device for displacing said element in a respective direction, first biasing means arranged to be effective in the non-conductive condition of said device for maintaining the same substantially non-conductive until said output voltage reaches a first predetermined value, second biasing means arranged to be effective in the conductive condition of said device for maintaining the same substantially conductive until said output voltage reaches a second predetermined value, a transmission line connected across the output of said source, a source of balancing voltage connected across the other end of said transmission line, the last-mentioned source having a displaceable element, a motor coupled to said displaceable element, unbalance-responsive control means for said motor connected across a portion of said line and adapted to actuate said motor so as to tend to match said balancing voltage to said variable voltage, and a load coupled to said motor.

8. The combination according to claim 7 wherein said load comprises a variable impedance element of a tuned circuit forming part of a radio receiver.

MICHEL N. YARDENY.
ADOLPH RAZDOWITZ.

REFERENCES CITED

The following references are of record in the file of this patent:

UNITED STATES PATENTS

| Number | Name | Date |
|---|---|---|
| 2,086,030 | Hodgson et al. | July 6, 1937 |
| 2,264,333 | Satterlee | Dec. 2, 1941 |
| 2,297,719 | Satterlee | Oct. 6, 1942 |
| 2,416,229 | Shoemaker | Feb. 18, 1947 |